JOHN M. GAVASSO
INVENTOR.

ATTORNEYS

Dec. 3, 1968 J. M. GAVASSO 3,413,965
MECHANISM FOR VARYING THE OPERATION OF A RECIPROCATING MEMBER
Filed July 13, 1967 4 Sheets-Sheet 2

JOHN M. GAVASSO
INVENTOR.

BY John K. Faulkner
Glenn S. Arendsen
ATTORNEYS

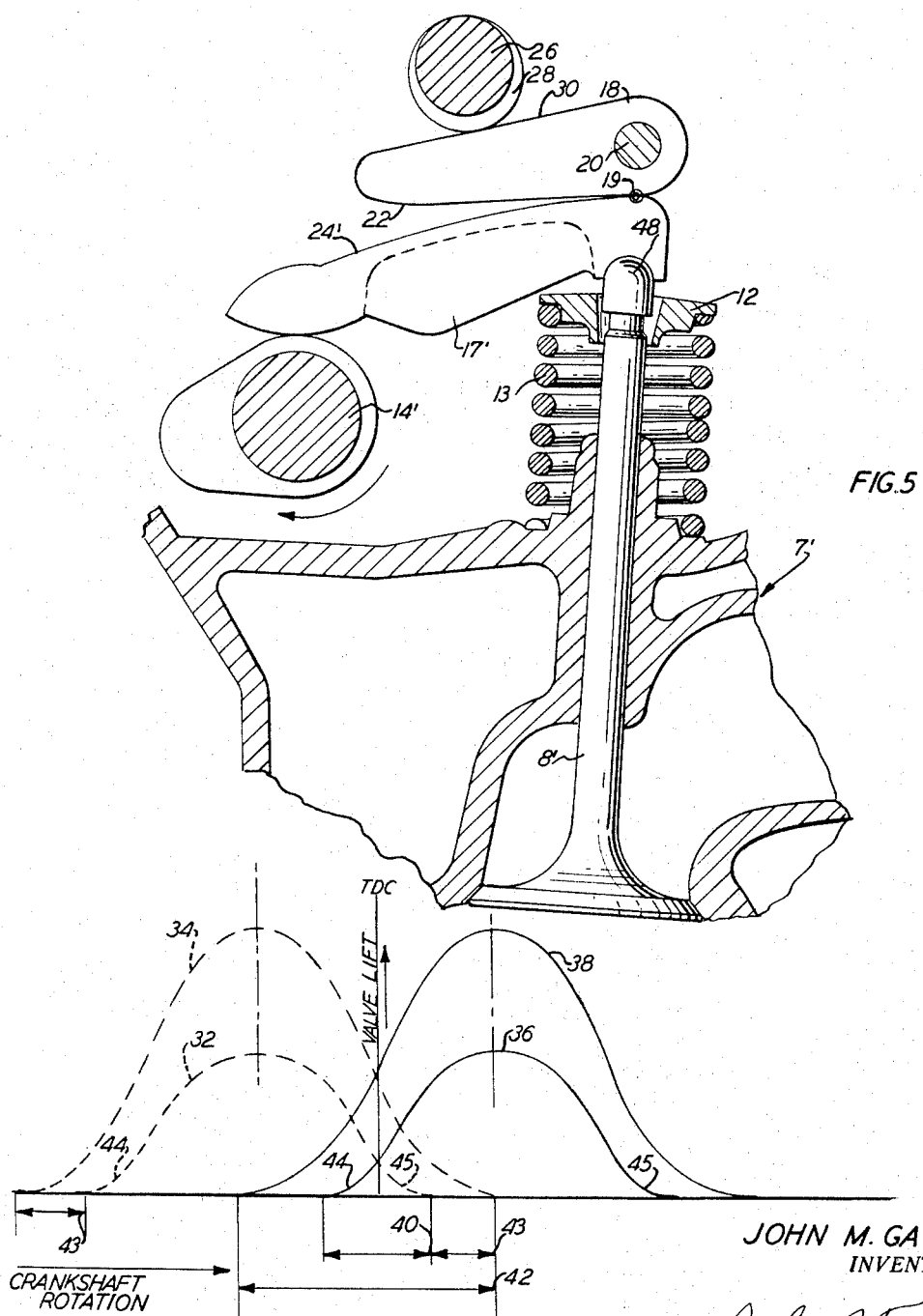

United States Patent Office 3,413,965
Patented Dec. 3, 1968

3,413,965
MECHANISM FOR VARYING THE OPERATION
OF A RECIPROCATING MEMBER
John M. Gavasso, Detroit, Mich., assignor to Ford
Motor Company, Dearborn, Mich., a corporation
of Delaware
Filed July 13, 1967, Ser. No. 653,129
9 Claims. (Cl. 123—90)

ABSTRACT OF THE DISCLOSURE

This mechanism comprises an elongated lever pivoted at one end and extending parallel to a rocker arm located in the actuating train of a reciprocating valve, with the inner surface of the lever contacting the outer surface of the rocker arm. The contacting surfaces are contoured so the lever serves as a fulcrum for the rocking motion of the rocker arm. During the rocking motion, the contact point between the lever and the rocker arm moves along the surfaces. An eccentric portion of a rotatable shaft contacts the outer surface of the lever and rotation of the shaft pivots the lever, thereby changing the crankshaft angle at which the valve begins its operational event.

Summary of the invention

In a reciprocating internal combustion engine operating at high speed it is desirable to open the exhaust valve before the piston reaches bottom dead center on the power stroke to reduce the amount of negative work the engine must do in pumping out exhaust gases. Also, the intake valve should open before the piston reaches top dead center on the exhaust stroke to encourage scavenging and should close well after the piston reaches bottom dead center on the intake stroke to increase the charge to the cylinders.

At low speeds, however, opening the exhaust valve before the piston reaches bottom dead center on the power stroke dissipates more of the expansion energy of the combustion gases than is recovered by reducing the pumping work in the exhaust stroke. Also, opening the intake valve before the piston reaches top dead center of the exhaust stroke results in dilution of the incoming charge by the exhaust gases, and closing the intake valve after the piston reaches bottom dead center on the intake stroke decreases the amount of charge to the cylinder. Low or medium speed operation of an engine having the operational events of its valves designed for high speeds reduces fuel economy, while high speed operation of an engine having the operational events of its valves designed for low speeds reduces power.

Ideally then, it is desirable to vary the operational event of intake and exhaust valves with the speed or type of operation of the internal combustion engine. In addition to the improvements in economy and power, reductions in undesirable exhaust emissions also result therefrom. Similar changes are desirable for other reciprocating members such as reciprocating pumps where the changes improve efficiency.

A prior art mechanism directed at this result located a worm and gear arrangement in the components connecting the valve to the valve actuating cam that was capable of adjusting the effective length of one of these components, thereby changing valve lift and timing by changing the points on the actuating cam at which valve operation began and ended. Using the same basic principle of changing the effective length of some component in the valve train, other prior art systems substituted various mechanisms in place of the worm and gear arrangement.

The commercial success of these prior art systems suffered primarily because of two difficulties. First, the presence of the worm and gear arrangement or its equivalent in the drive train increased the mass of the drive train significantly and the high inertia forces resulting from the rapid acceleration of the increased mass necessitated increased load carrying ability in the valve train components themselves, the camshaft and bearing surfaces. Second, the slow rising ramps designed into the camshaft to reduce the load and noise of the valve train were bypassed when the mechanisms were in any setting other than an event of maximum time.

Absolutely no mass is added to the valve train by the mechanism of this invention in most of its applications, and it is possible to produce the equivalent of the slow rising ramps on the camshaft in all of its applications. In the operating train for a reciprocating member actuated by one end of a rocker arm, the mechanism of this invention comprises a fulcrum member positioned adjacent the rocker arm with a surface of the fulcrum member contacting a surface of the rocker arm. The contact point between the surfaces serves as the fulcrum point for the rocker arm, and the contact point moves along the surfaces during the rocking motion of the rocker arm. A means for changing the position of the fulcrum member then also changes the operational event of the reciprocating member, the operational event being the time period during which the reciprocating member is extended. The phrase "changes in the operational event" as used in this specification refers to changes produced by the mechanism of this invention as distinguished from changes produced by increasing or decreasing the rotational speed of the camshaft.

An elongated lever pivoted at one end and located on the side of the rocker arm opposite of the reciprocating member serves efficiently as the fulcrum member. Changing the lever's absolute pivot angle, i.e., the angle of the lever with respect to some fixed axis such as the reciprocating axis of the reciprocating member, changes the time relative to the crankshaft rotational angle at which the reciprocating member begins to move. This occurs because the relative angle between the lever and the longitudinal axis of the rocker arm at which the reciprocating member begins to move is constant regardless of the absolute pivot angle of the lever. Increasing the absolute angle of the lever relative to the longitudinal axis of the rocker arm when the reciprocating member is retracted delays the opening of the reciprocating member by the time period required for the rocker arm to make up the increase. Loads on the mechanisms are minimized by locating the pivot for the lever on the reciprocating axis of the reciprocating member and contouring the lever and rocker arm surfaces so the contact point also is on the reciprocating axis when the reciprocating member is retracted. The lever and rocket arm contact surfaces can be contoured as desired to produce various operational effects.

The mechanism of this invention is very useful in the valve trains for the overhead reciprocating or poppet-type valves of a reciprocating internal combustion engine. In such an engine, the pivoted lever is located above the rocker arm, and a rotatable shaft having an eccentric portion contacting the upper surface of each lever is positioned in the engine so the eccentric portion can pivot the levers associated with each of the intake and exhaust valves. If desired, separate shafts can be provided for the intake valves and the exhaust valves. Mechanical or electrical sensing devices responsive to the speed or load of the engine can be included to adapt automatically the operational events to the engine requirements.

Brief description of the drawings

FIGURE 4 is a graph of the valve lift curves provided by associating mechanisms of this invention with both the intake and exhaust valves of the engine of FIGURE 1. FIGURE 5 is a sectional view similar to FIGURE 1 showing the mechanism of this invention in an overhead valve internal combustion engine having an overhead camshaft.

*Detailed description*

Figure 1:
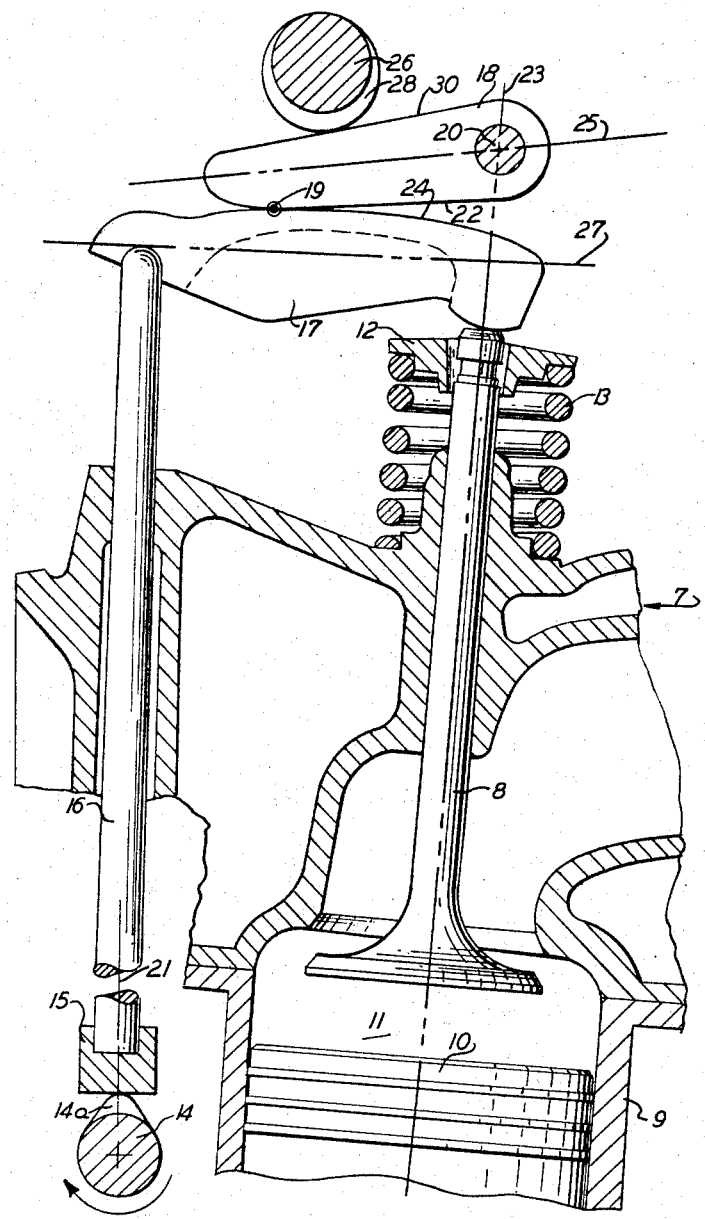
FIGURE 1 is a partial sectional view of the head of an overhead valve internal combustion engine containing the mechanism of this invention, with the fulcrum member positioned for the maximum operational event and the valve at its fully opened position.

In FIGURE 1, an engine head represented generally by the numeral 7 for a reciprocating internal combustion engine contains a poppet-type reciprocating valve 8. Head 7 is mounted on a conventional engine block 9 containing a piston 10 forming a combustion chamber 11 therewith. At least two valves of the type represented by valve 8 open into combustion chamber 11, one serving as the intake valve and the other as the exhaust valve. A valve retainer 12 is located at the upper end of valve 8 and a valve spring 13 positioned between retainer 12 and head 7 urges valve 8 toward its closed or retracted position.

A conventional engine camshaft 14 is mounted rotatably in block 9 and a tappet 15 rides on a cam 14a thereof. A pushrod 16 has its lower end contacting tappet 15 and extends through head 7, contacting one end of a rocker arm 17 above the head. Pushrod 16 can move only axially relative to the head, and its upper end fits into a socket formed in rocker arm 17 to prevent side motion of rocker arm 17. The other end of rocker arm 17 contacts the top of valve 8, and tappet 15, pushrod 16 and rocker arm 17 make up the valve train used to actuate valve 8.

An elongated lever 18, the fulcrum member, is mounted pivotally on a shaft 20 fixed with respect to engine head 7. Lever 18 extends above rocker arm 17 so the lower contoured surface 22 of lever 18 contacts the upper contoured surface 24 of rocker arm 16 at a contact point represented by a bull's-eye 19. Located above lever 18 is a shaft 26 rotatable with respect to engine head 7 and having an eccentric portion 28 contacting the upper surface 30 of lever 18.

*Operation of FIGURE 1*

Rotation of the engine camshaft 14 imparts reciprocating motion to tappet 15 and pushrod 16 along a fixed axis 21, and the latter imparts a rocking motion to rocker arm 17. Resulting from the motion of rocker arm 17 is a reciprocating motion of valve 8 that occurs along a reciprocating axis, also fixed, represented by numeral 23. Imaginary longitudinal axes 25 and 27, both of which are movable, have been drawn through lever 18 and rocker arm 17, respectively.

Figures 2, 3:
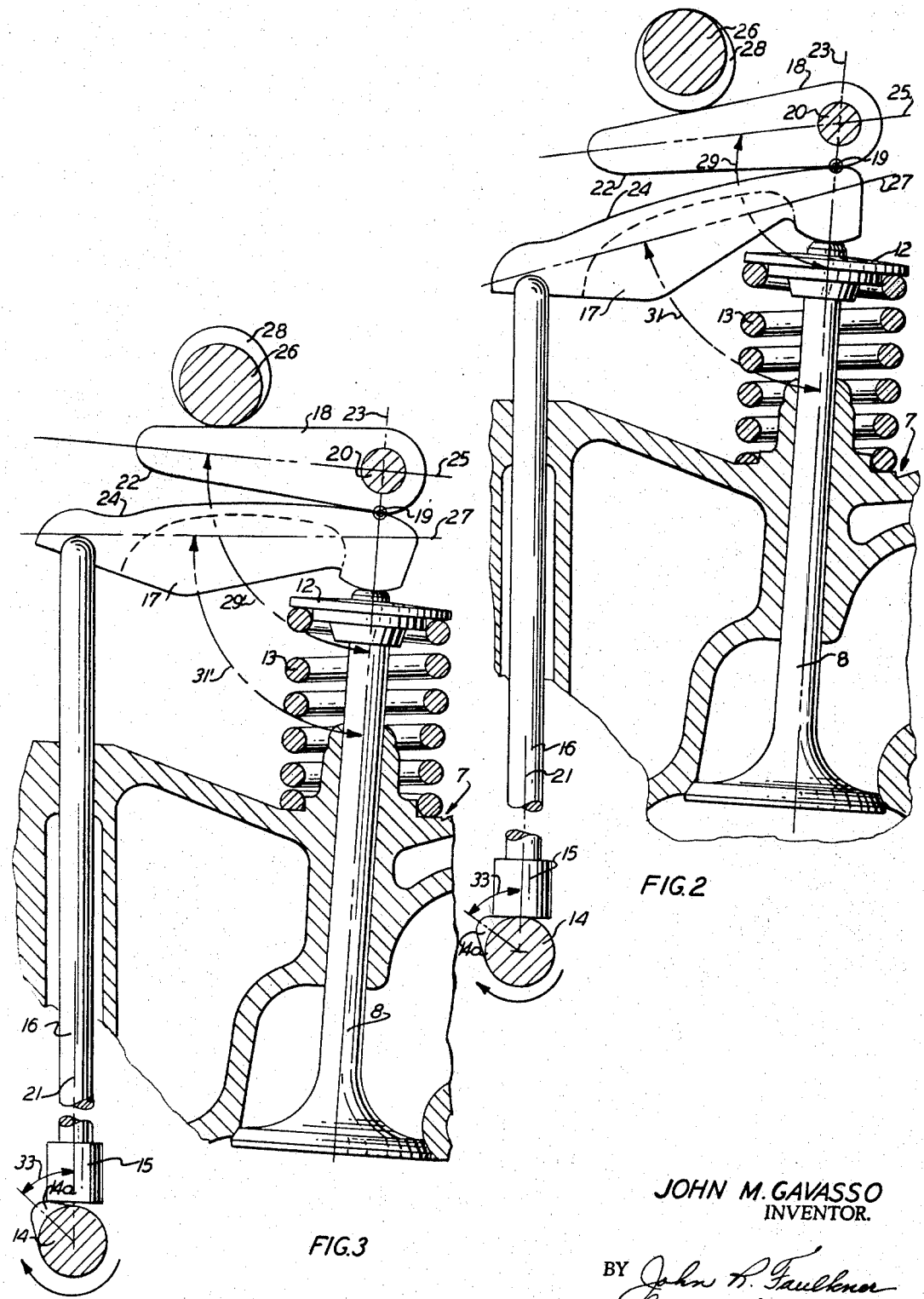
FIGURES 2 and 3 are partial views showing two additional operational stages of the valve train of FIGURE 1; in the former the fulcrum member is in the same position as FIGURE 1 but the camshaft is in the position where valve opening is incipient, and in the latter, the fulcrum member has been positioned to produce the minimum operational event and valve opening is incipient.

Additional operational stages of the FIGURE 1 construction are shown in FIGURES 2 and 3. For a maximum valve event, shaft 26 is rotated so eccentric portion 28 pivots lever 18 to some maximum counterclockwise position shown in FIGURES 1 and 2 where axis 25 is at an angle 29 relative to fixed axis 23. When camshaft 14 has rotated its cam 14a to the point where no lift is imparted to tappet 15 but such lift is incipient, the axis of cam 14a makes an angle 33 with axis 21, valve 8 is seated and contact point 19 is located substantially on reciprocating axis 23 as shown in FIGURE. 2.

In the next incremental rotation of camshaft 14, contact point 19 begins moving to the left along contact surfaces 22 and 24 and valve 8 opens.

Continued rotation of camshaft 14 continues the movement of contact point 19 to the left and continues to open valve 8 until the maximum lift position shown in FIGURE 1 is reached. As camshaft 14 moves beyond the maximum lift position, contact point 19 moves back to the right until cam 14a has moved out of touch with tappet 15. In this position, contact point 19 has returned to axis 23 and valve 8 has moved back to its seat. The amount of time valve 8 has been off its seat is the operational event of the valve.

The operational event of valve 8 is reduced by rotating shaft 26 so eccentric portion 28 permits lever 18 to pivot clockwise about shaft 20 to the position shown in FIGURE 3. Axis 25 now is at an angle 29' relative to axis 23, with angle 29' being greater than angle 29.

When camshaft 14 rotates cam 14a to the point where lift to tappet 15 again is incipient, the axis of cam 14a again forms angle 33 with axis 21 and axis 27 is still at angle 31 relative to axis 23 (FIGURE 3). In the next incremental rotation of camshaft 14, lift is transmitted through tappet 15 and rod 16 to the left end of rocker arm 17, thereby increasing angle 31. Contact point 19 remains on axis 23, however, until angle 31 has increased to an angle 31' shown in FIGURE 3. Camshaft 14 has rotated cam 14a so the axis of cam 14a forms an angle 33' with axis 21, with angle 33' being less than angle 33. The difference between angles 29 and 31 in FIGURE 2 equals the difference between angles 29' and 31' in FIGURE 3 when valve opening is incipient; thus the angle between the lever and the rocker arm at which the reciprocating member begins to move is constant regardless of the absolute pivot angle of the lever.

Valve 8 now begins to open and contact point 19 begins moving to the left along surfaces 22 and 24. The beginning of valve opening has been delayed from its beginning in the FIGURE 2 arrangement by the amount of time required to rotate camshaft 14 from angle 33 to angle 33'. Thus a change in the absolute angle of the lever varies the rotational position of the cam at which the operational event of the valve begins. Similarly, the valve closes earlier in the FIGURE 3 arrangement by an equivalent amount of time and the FIGURE 3 arrangement thereby produces an operational event shortened by twice the amount of time required for camshaft 14 to rotate through the angular difference between angles 33 and 33'. The portions of surfaces 22 and 24 just to the left of axis 23 are contoured so valve 8 opens and closes with a slow rising effect.

A graphic illustration of the effect of changing angle 29 is shown in FIGURE 4. Assuming that valve 8 is an exhaust valve, dashed line 34 represents the operational cycle of valve 8 when axis 25 of lever 18 forms angle 29 with axis 23 as shown in FIGURE 2 while dashed line 32 shows the operational cycle of the same valve when the angle has been increased to angle 29' shown in FIGURE 3. The difference in the operational event is the sum of the time periods represented by the numeral 43, and the slow rising effect on opening and closing the valve in the FIGURE 3 arrangement is represented by numerals 44 and 45, respectively. Note that the slow rising effect of the FIGURE 2 arrangement is a combination of the slow rising ramps built into the camshaft and the contours of surfaces 22 and 24. This is advantageous in reducing acceleration when the mechanism is set for maximum valve event. If desired, the slow rising ramps on the camshaft can be modified or eliminated so the contours of surfaces 22 and 24 just to the left of axis 23 determine the slow rising effect for all settings. The remaining portions of surfaces 22 and 24 can be contoured as desired to produce operational cycle curves having various shapes.

Combining a similar mechanism with the intake valve of the engine produces the operational cycles represented by solid lines 36 and 38, respectively. The vertical line in the middle of the diagram shown in FIGURE 2 represents the top dead center position of the piston served by the valves. With the valves operating on lines 32 and 36, respectively, the amount of overlap is represented by the distance 40 while with the valves operating on lines 34 and 38, respectively, a much greater overlap represented by the distance 42 is provided. Thus the valves preferably are operated on lines 34 and 38 at high speeds and on lines 32 and 36 at lower speeds.

Figure 6:
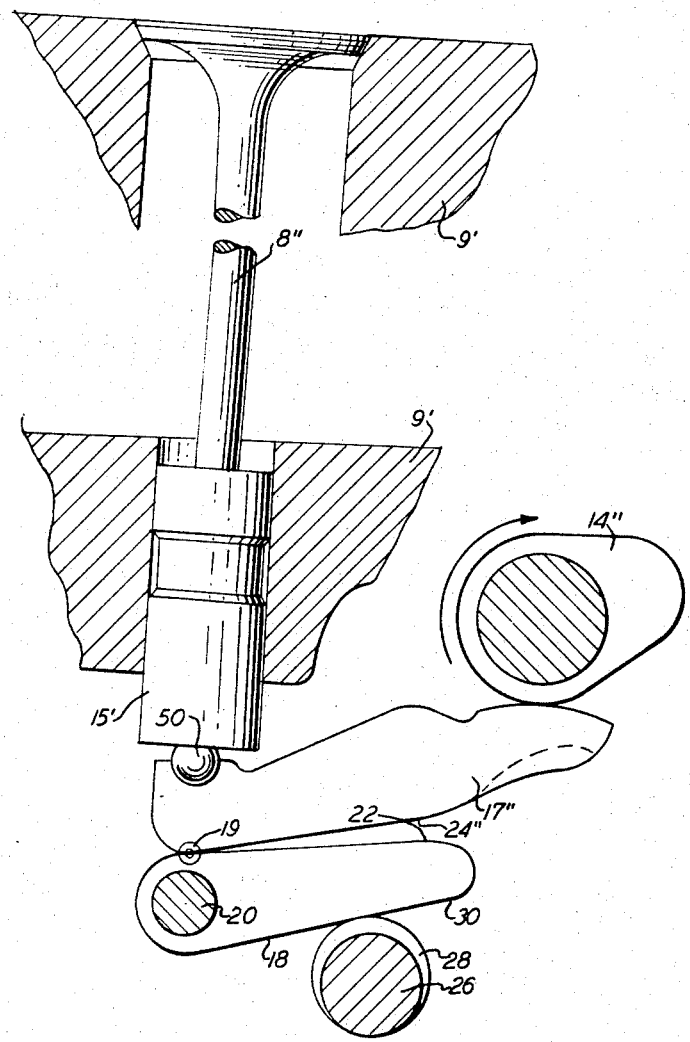
FIGURE 6 is a sectional view of a portion of the block of an internal combustion engine showing an adaptation of the mechanism of this invention to an engine having the camshaft and the valves in the block. The FIGURE 6 arrangement also can be used in an engine having the camshaft in the block and the valves in the head if desired.

*Construction and operation of FIGURES 5 and 6*

The engine shown in FIGURE 5 has an overhead camshaft 14' contacting rocker arm 17' directly. Valve 8' has a ball-shaped upper end indicated by the numeral 48 that fits into a corresponding socket in rocker arm 17' to resist sidewise forces imparted to rocker arm 17' by camshaft 14'. Rotation of camshaft 14' produces rocking motion of rocker arm 17' that pivots again about the contact point 19 between surfaces 22 and 24' to produce appropriate reciprocating motion of valve 8'.

In FIGURE 6 camshaft 14" is located in engine block 9' away from the center line of valve 8". A rocker arm 17" rides at one end on camshaft 14" and has a socket at the other end fitting on a ball 50 attached to tappet 15'. Tappet 15' slides in block 9' and contacts valve 8" directly. The spring and spring retainer have been removed from FIGURE 6 for clarity.

Shaft 20' is located below tappet 15' and lever 18 projects below rocker arm 17" in such a manner that surfaces 22 and 24" are in contact at contact point 19. Shaft 26 is located below lever 18 and eccentric 28 bears on surface 30 of lever 18 as described above. Rotation of cam 14" imparts a rocking motion to rocker arm 17" directly, and rocker arm 17" pivots about the contact point 19 between surfaces 22 and 24" to produce reciprocating motion of tappet 15' and valve 8. Lever 18 is pivoted about shaft 20' as described above to vary the operational event as desired.

A hydraulic lash eliminator can be included in the mechanism of this invention by positioning such an eliminator on the reciprocating axis of the valve in contact with the side of the lever opposite from the valve. Shaft 20 or 20' then is deleted, and the eliminator is fitted into the lever so the eliminator tip provides the pivot axis for the lever. A U-shaped member can be positioned with its legs surrounding the lever and rocker arm to prevent twisting movement thereof.

In an engine, means responsive to engine speed or manifold vacuum can be coupled to a servo motor capable of turning shaft 26 to produce the desired operational event automatically, or manual means operable by the vehicle driver can be used to position shaft 26. In other devices such as reciprocating pumps for example, means sensitive to the output pressure can be used to position shaft 26.

Thus this invention provides a mechanism for varying the operational event of a reciprocating member in which a movable fulcrum member contacts a rocker arm to provide the fulcrum point therefor with the angle of the fulcrum member determining the time period of the operational event. The mechanism preferably is designed so the fulcrum point moves along the contact surfaces during the operational event and returns to the reciprocating axis of the reciprocating member when the reciprocating member is in its retracted or closed position. Alternatively, the mechanism could be designed so the fulcrum point locates at various positions along the contact surfaces when the reciprocating member is in its retracted position, with the distance of the fulcrum point from the reciprocating axis determining the delay of the operational event. Such an alternative can be obtained by changing the contour of the contact surfaces of the rocker arm and the fulcrum member.

A major advantage of the mechanism lies in its ability to change the operational event of a reciprocating member without producing extremely rapid acceleration or deceleration of any component in the operating train. This advantage, combined with the simplicity and ease of manufacturing and assembling the mechanism, renders the mechanism widely useful in increasing economy and power while reducing undesirable exhaust emissions of internal combustion engines.

I claim:
1. In an operating train for converting rotational motion of a cam into reciprocating motion of a reciprocating member through a rocker arm, a mechanism for varying the operational event of the reciprocating member comprising a fulcrum member positioned adjacent said rocker arm with a surface of said fulcrum member contacting a surface of said rocker arm, the contact point between said surfaces providing the fulcrum point for said rocker arm, said fulcrum member being an elongated lever pivotally mounted at one end, and means for moving said fulcrum member to change the operational event of the reciprocating member, said means including a shaft having an eccentric portion contacting the fulcrum member, said shaft being rotatable so said eccentric portion pivots the fulcrum member.

2. The operating train of claim 1 in which the contact point between the lever and the rocker arm moves longitudinally along the lever and rocker arm while the reciprocating member is reciprocated.

3. The operating train of claim 2 in which the absolute angle of the lever varies the rotational position of the cam at which the operational event of the reciprocating member begins.

4. The operating train of claim 3 in which the reciprocating member is a poppet-type valve for a reciprocating engine.

5. The operating train of claim 4 in which the angle between the lever and the rocker arm at which the reciprocating member begins to move is constant regardless of the absolute pivot angle of the lever.

6. The operating train of claim 5 in which the contact point between the lever and the rocker arm lies on the reciprocating axis of the reciprocating member when the reciprocating member is in its rest position.

7. The operating train of claim 1 in which the angle between the lever and the rocker arm at which the reciprocating member begins to move is constant regardless of the absolute pivot angle of the lever.

8. The operating train of claim 1 in which the reciprocating member is a poppet-type valve for a reciprocating engine.

9. The operating train of claim 1 in which the contacting surfaces of the fulcrum member and the rocker arm are contoured so the contact point therebetween lies on the reciprocating axis of the reciprocating member when the reciprocating member is retracted for all positions of the fulcrum member.

References Cited

UNITED STATES PATENTS

| | | | |
|---|---|---|---|
| 1,710,291 | 4/1929 | Brush | 123—90 |
| 1,797,105 | 3/1931 | Shoblom | 123—90 |
| 2,183,436 | 12/1939 | Towler et al. | 74—522 X |
| 2,851,023 | 9/1958 | Durkan | 123—90 |
| 3,032,854 | 5/1962 | Bruyere | 74—53 X |
| 3,166,057 | 1/1965 | Konrad et al. | 123—90 |

AL LAWRENCE SMITH, *Primary Examiner.*